Nov. 10, 1970   NAOYUKI NAMEISHI   3,539,667
METHOD OF MAKING ORIENTED PERMEABLE REFRACTORIES
CONTAINING PASSAGES
Filed June 8, 1967   2 Sheets-Sheet 2

INVENTOR.
Naoyuki Nameishi
BY
Wenderoth, Lind & Ponack,
Attorneys

United States Patent Office 3,539,667
Patented Nov. 10, 1970

3,539,667
METHOD OF MAKING ORIENTED PERMEABLE REFRACTORIES CONTAINING PASSAGES
Naoyuki Nameishi, Takasago, Japan, assignor to Harima Refractories Co., Ltd., Takasago, Japan
Filed June 8, 1967, Ser. No. 644,585
Int. Cl. C04b 33/32; B28b 11/00
U.S. Cl. 264—56      3 Claims

ABSTRACT OF THE DISCLOSURE

A refractory body provided with a number of fine passages extending from one side to the other in a predetermined orientation through the body is made by the method of pouring a slurry refractory material into a mold within which a continuous length of combustible string or a net of the strings has been spanned, forming said refractory material into a desired shape, removing it from the mold, drying it, and burning it at an elevated temperature to burn off the string to leave the desired fine passages within the refractory.

---

The present invention relates to a method of making oriented permeable refractories, and more particularly, to novel oriented permeable refractories provided with a plurality of oriented fine passages extending from one side to the other in a predetermined orientation.

It is known that among the refractory products, there are some called, "permeable," meaning the property of a body which permits gases or liquids to flow through its pores. When a permeable refractory body is provided at the bottom or side of a metallurgical vessel filled with a hot melt, such as, molten steel, in order to blow a quantity of gas through the permeable refractory body into the molten metal in the vessel, it is found that blowholes form in the metal near the surface of the permeable body. It is also known that miscellaneous important metallurgical reactions or physical control can be carried out by the stirring action resulting from the rise of such blowholes and the movement of molten steel. The material of the permeable refractory is required to be sufficiently refractory to withstand the hot liquid metal in the vessel and not be easily eroded thereby.

As the permeable refractory, a chamotte made so as to be particularly porous is widely employed. However, in the manufacture of permeable refractory, it has never been proposed in the past to provide orientation to the pores found in the refractory or a number of fine passages extending from one side to the other in a predetermined orientation through the refractory body. As a matter of fact, an oriented porous or permeable refractory body has never existed in the refractory industry.

The permeable or porous refractory has been manufactured by several methods as follows: one method comprises the steps of adding combustible fragmentary pieces to the slurry refractory material prior to burning without taking orientation of pores into consideration, and then subjecting the refractory material containing combustible pieces to burning to reduce them to ashes, whereby a permeable or porous refractory is produced; another method consists in making a permeable or porous refractory by adding a porous material to the refractory material; and another method consists in making a refractory body by burning a refractory material having a predetermined grind of grain particles.

In view of the random distribution of pores thus made, it is clear that the permeable or porous refractory made in accordance with the conventional method referred above has no orientation of the pores.

When it is desired to blow a quantity of gas, such as, inert gas, through the permeable or porous refractory into a hot melt, such as steel melt, to be treated, it is convenient to blow the gas from one side of the refractory brick which is not exposed to the hot melt to the other side thereof exposed to the melt through the brick in a predetermined orientation. Therefore, it will be satisfactory to provide a number of fine passages extending from one side to the other through the brick.

However, a permeable refractory body having a number of fine passages extending from one side to a side other than the side specified above is not only useless, but harmful. For example, if a quantity of gas blown from one side of the refractory should reach another side not exposed to the hot liquid metal, it would dissipate away, which results in a loss of gas. If this side is exposed to the refractory lining of a hot melt vessel through a mortar joint, and besides, if a quantity of gas blown should reach this side, the blown gas will be in contact with the hot melt through the mortar joint so that the joint mortar will be destroyed, whereby the hot melt will infiltrate into the refractory lining to deteriorate it.

Independent blowholes called "sealed voids" which do not communicate with one another are very often present in the refractory block. In this case, it has been found that the sealed independent blowholes or voids are not only useless for blowing the gas, but sometimes deleterious. Owing to the presence of sealed blowholes, in general the refractory brick is subject to the action of hot melt as well as corrosion.

As described above, the permeable or porous refractory made in accordance with the conventional method has a number of pores which are not oriented in the sense referred to above, hence they are of no use for the purpose in view. When the permeable or porous refractory of the prior art is employed in order to blow gas through it, it usually happens that it brings about a loss of gas, and the destruction of joint mortar as well as of refractories.

The present invention seeks to overcome the above disadvantages, and provide a novel permeable refractory having a number of oriented fine passages extending from one side to the other thereof through the refractory block. In accordance with the invention, a novel and improved refractory provided with a number of fine pore passages extending from one side to the other thereof in a predetermined orientation can be manufactured so that the direction of orientation can be given as desired in the production of refractories, and further, the loss of gas together with the deterioration of joint mortar can be prevented.

Accordingly, it is an essential object of the invention to provide a method of making a novel refractory having a number of fine pore passages extending from one side to the other side thereof in a predetermined orientation so as to blow a quantity of gas through it.

It is another object of the invention to provide a novel refractory product having a number of fine pore passages extending from one side to the other thereof in a predetermined orientation so as to blow a quantity of gas through it.

Other objects and advantages of the invention will be apparent from the following description which, taken in connection with the accompanying drawing, discloses several preferred embodiments thereof.

Referring to the drawing.

Figure 1:
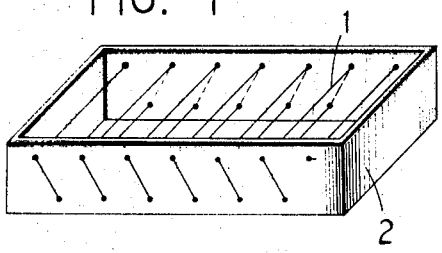
FIG. 1 is a perspective view of a mold for molding an oriented porous refractory wherein a number of strings are positioned in the mold so as to span it before it is filled with a slurry refractory material or slip.

It is to be noted that the refractory of this invention has a dense structure except the portion containing a fine passage extending from one side to the other thereof in a predetermined orientation. The side face of the permeable refractory exposed to hot melt becomes weak with respect to the bond strength between refractory grains which constitute the refractory, because it is always exposed to the hot melt. The force of the blown gas is applied to the weak area mentioned above, so that the refractory grains thus weakened are driven into the hot melt, which results in the destruction of refractories.

To reduce the above destroying action to a minimum or prevent it from occurring, it is necessary to make the bond strength strong so as not to be weakened by the temperature of the hot melt. Though it is possible to make it strong, FeO combines with the ingredients of the joint portion to produce low melting substances owing to the infiltration of FeO in the steel melt into the refractory lining. Hence, the bond strength is weakened and the damage of refractories continues.

However, this damage action will be inhibited by making the number of voids in the refractory as small as possible. On the other hand, however, if the number of voids or pores in the conventional permeable refractory is reduced to as low a number as possible, its permeability will be lowered. Therefore, it will be difficult to blow a required amount of gas into the hot melt in a predetermined period of time, which means the loss of action as a permeable refractory. This phenomenon has been experienced in the past.

Briefly stated, the method of making an oriented permeable refractory in accordance with the invention comprises the steps of making a number of oriented fine passages by burning of filamentary material embedded in the refractory material when molded; another method of making a number of oriented fine passages is by withdrawing metallic wires embedded in the refractory material when molded; and another method of making a number of oriented fine passages is by embedding refractory pipes during molding.

The method of making an oriented permeable refractory of this invention is advantageous in that the orientation of pores can be selected as desired as shown in FIGS. 14–18, and further, a very dense and strong refractory having a number of oriented pore passages can be made.

The material to be embedded in the refractory in order to give an oriented permeability may be selected in various ways. For example, a combustible filamentary material used to produce a fine pore by burning it after it has been embedded in the refractory during molding is selected from the group consisting of cotton string, silk string, string made of synthetic fiber, such as, vinyl, nylon, staple fiber, polyethylene, and polypropylene, and a net of meshed fabric, and further, bamboo or wood may be employed. An incombustible filamentary material can be selected from the group consisting of iron wire, steel wire, piano wire, copper wire and other metallic wire can be used, too. When a number of oriented fine passages are desired in the refractory by withdrawing a metallic wire embedded when molded, all the metallic wire material can be employed.

Permeability of the refractory body made by the invention can be controlled as desired by providing the proper size of wire and number of wires to be embedded in the refractory, or the proper combustible filamentary or rod-like material therein when molded. It is found that the permeability of the refractory can be controlled in the range of 1.0–5.0 cubic cm. per cm. per sq. cm. per second per cm. Permeability of 4.85 cu. cm. per cm./sq. cm. per second per cm. can be obtained by providing a net of 5 sq. mm. mesh of nylon filament size 0.5 mm. at the rate of one pore per sq. cm. In addition, permeability of 1.03 can be obtained by providing a net of 10 sq. mm. mesh of nylon filament size 0.5 mm. at the rate of one pore per 2 sq. cm. It is easy to establish other values of permeability than those specified above.

It should be understood that the material adopted for the refractory of this invention depends upon the hot melt in a vessel. In case of molten steel, a refractory material adapted for making the refractory of this invention can be a material selected from the group including corundum, mullite, magnesia, silicate, zircon, zirconia, thoria and other equivalent refractory material. Because of the fact that permeability can be obtained by means of wire or the like to be embedded, or, alternatively, combustible filamentary or bar-like material irrespective of the refractory material, the refractory composition in question can be any one of a wide range of such materials. In this respect, the present invention is also advantageous.

As a method of molding a refractory shape in accordance with the invention, either slip casting or semi-dry molding can be employed. The method of making an oriented permeable refractory body according to the invention will be described in connection with the accompanying drawing.

Figure 2:
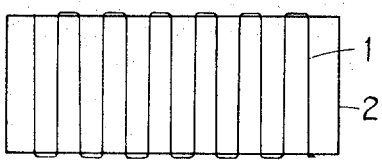
FIG. 2 is a top plan view of FIG. 1.
Figure 3:
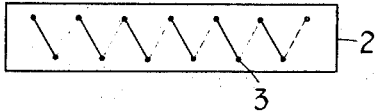
FIG. 3 is a side view of FIG. 1.

FIGS. 1–3 show the method of slip casting. As shown, a plurality of small holes 3 required (see FIG. 3) are drilled through opposite sides of a mold 2, through which a continuous length of filamentary material 1 is continuously threaded as required, and thereafter a slurry refractory material is poured into the mold 2 wherein a length of filament has already been positioned so as to span the mold. Then the refractory shape is removed from the mold, dried, and burned at an elevated temperature to burn off the filament, leaving a number of oriented fine passages.

Figure 4:
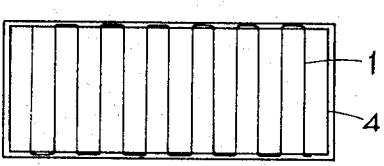
FIG. 4 is a top plan view of an aluminum foil mold together with the mold similar to that of FIG. 2.
Figure 5:
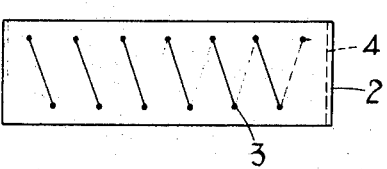
FIGS. 5a and 5b are partial sectional views of the mold of FIG. 4 before and after molding.

FIGS. 4–5 show the method of semi-dry or partially dry molding in which a number of fine holes 3 required are drilled through opposite sides of an aluminum foil sheet 4 having a height two times as big as that of the final product, and a continuous length of filament 1 is threaded through holes 3. This aluminum foil 4 is positioned in the mold 2 into which a refractory mix is placed to form a desired shape. The aluminum foil sheet is collapsed so that its final height is one half the initial height thereof as shown in FIG. 5b.

Figure 6:
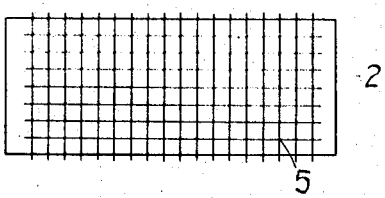
FIG. 6 is a top plan view of a net to be embedded in a refractory.
Figure 7:
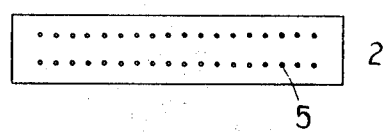
FIG. 7 is a side view of a mold wherein two layers of net span the mold.

FIG. 6–7 show that two layers of nylon net 5 are spanned across the mold 2 into which a refractory mix will be filled and pressed under pressure. Then, the refractory shape is removed from the mold 2 and burned at an elevated temperature.

Figure 8:
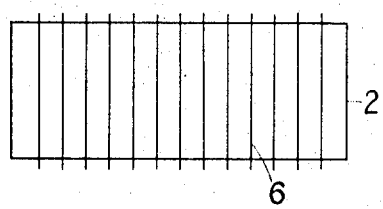
FIG. 8 is a top plan view of incombustible material.
Figure 9:
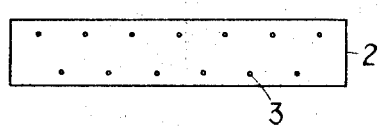
FIG. 9 is a side view of FIG. 8.

FIGS. 8–9 show that a plurality of small holes 3 required are drilled through opposite sides of a mold 2 into which a plurality of steel wires 6 of desired section, say, 0.5–1 sq. mm. are inserted, then a refractory mix is placed in the mold 2 and pressed under pressure to form a desired shape, then the refractory shape is removed from the mold, and finally, the refractory is burned at an elevated temperature. When the steel wire is removed, a number of oriented fine passages remain within the refractory.

Relatively fine passages are made in the refractory by th above methods, but it is understood that the method of making relatively large passages falls into the scope of the claims of this invention.

Figure 10:
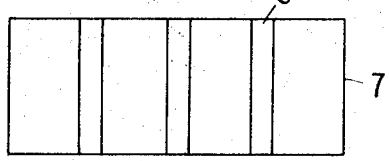
FIG. 10 is a top plan view of one side of refractory wherein a plurality of recesses are provided.
Figure 11:
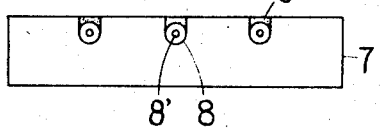
FIG. 11 is a side view of FIG. 10.
Figure 12:
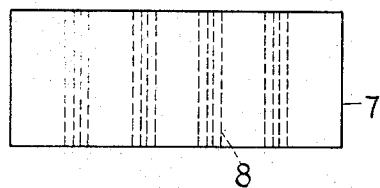
FIG. 12 is a top plan view of a refractory wherein a plurality of bores are provided.
Figure 14:
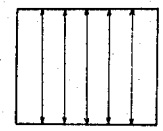
FIGS. 14–18 are diagrammatic views of oriented passages provided within the refractory.
Figure 13:
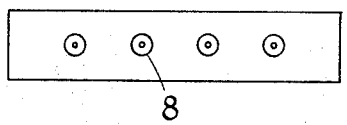
FIG. 13 is a side view of FIG. 12.
Figure 15:
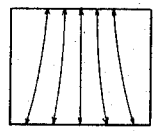

In FIGS. 10–13, there is shown a high refractory pipe having one or a plurality of fine passages therein adapted for embedding in the refractory material when molded or after being molded. This pipe may be porcelain insulator, or a thin one made of tungsten, molybdenum, titanium or thorium, the melting point of which is much higher than that of the steel melt. In FIGS. 10–11, there are provided a plurality of recesses on the end face of a dense refractory structure 7, and the high refractory pipe 8 having a fine passage 8' is placed on the recess and fixed with mortar 9. In FIGS. 12–13, is shown the method in which the porcelain pipe 8 is embedded in the center of the dense refractory structure 7. As described above, the pipe embedded in the refractory shown in FIGS. 10–13 is a material selected from the group including fire resistant insulators of porcelain, tungsten, molybdenum, titanium, and thorium. It is seen that a desired pore passage can be provided by selecting various sizes of bore in the pipe to be embedded.

In addition, to facilitate insertion of porcelain pipe into the refractory and prevent it from being pushed out by the pressure of gas, the pipe can be tapered. As described above, a pore passage in the porcelain pipe can be made large or small as desired, hence a desired bore passage can be made in the refractory by inserting an appropriate porcelain pipe having a desired bore.

If a pore passage is to be made by drilling, it may be possible to drill through the refractory a relatively large bore, but it is almost impossible to drill a fine bore. Even though a bore is long in spite of having a big diameter, it will be very hard to drill a long bore through the dense structure refractory.

Furthermore, a modified method of making an oriented pore passage through the refractory can be effected as described hereinbelow. A semi-circular notched portion is made on one side face of a refactory, and then the notched portion is filled with mortar or other known porous or permeable refractory material. After the mortar has set, it is possible to blow a quantity of gas through the mortar portion, because it is porous or permeable. The same method can be used to fill an oriented fine passage drilled through the refractory by mechanical means.

To facilitate filling the notch or passage, or preventing the mortar from being pushed out of the notch or passage by the pressure of gas, it is preferred that the notch or passage be tapered.

EXAMPLE 1

This example relates to the method of slip casting a refractory body.

Chemical analysis of refractory material adapted for the refractory body of this invention is shown in Table 1.

TABLE 1

| Material | SiO$_2$ | TiO$_2$ | Al$_2$O$_3$ | Fe$_3$O$_2$ | MgO | Alkali |
|---|---|---|---|---|---|---|
| (1) Electrofused alumina | 1.80 | 0.10 | 96.84 | 0.54 | | |
| (2) Calcined bauxite | 7.76 | 3.40 | 87.08 | 1.60 | | |
| (3) Sillimanite | 36.20 | 1.20 | 54.44 | 0.80 | | 0.36 |
| (4) Magnesia clinker | 0.36 | | 0.59 | 0.21 | 98.00 | |
| (5) Siliceous rock | 96.89 | | 0.43 | 1.30 | 0.90 | |
| (6) Bond clay | 54.13 | 0.92 | 29.74 | 1.50 | 0.49 | 0.92 |
| (7) Colloidal silica aq. solution | 30–31 | | | | | 0.25–0.30 |

NOTE.—The numerals are indicated by percent by weight.

The proportion of ingredients is shown as follows:

| | Particle size, mm. | Percent by weight |
|---|---|---|
| (1) Electrofused alumina | 1–0.3 | 35 |
| | 0.3–0.147 | 10 |
| | 0.147 | 55 |
| Colloidal silica aqueous solution | | 5 |
| Pulp waste liquor | | 1 |
| (2) Calcined bauxite | 1–0.3 | 35 |
| | 0.3–0.147 | 10 |
| | 0.147 | 55 |
| Colloidal silica aqueous solution | | 5 |
| Pulp waste liquid | | 1 |
| (3) Sillimanite | 1–0.3 | 35 |
| | 0.3–0.147 | 10 |
| | 0.147 | 55 |
| Colloidal silica aqueous solution | | 5 |
| Pulp waste liquid | | 1 |
| (4) Magnesia | 1–0.3 | 35 |
| | 0.3–0.147 | 10 |
| | 0.147 | 55 |
| Colloidal silica aqueous solution | | 5 |
| Pulp waste liquid | | 1 |
| (5) Siliceous rock | 1–0.3 | 35 |
| | 0.3–0.147 | 10 |
| | 0.147 | 55 |
| Colloidal silica aqueous solution | | 5 |
| Pulp waste liquid | | 1 |

Each of the refractory compositions described above having about 20% by weight water added thereto to make it in a creamy state was poured into a mold spanned by a nylon filament of 0.5 mm. size at the rate of two filaments per 1 sq. cm. as shown in FIGS. 1–3, then the refractory shape was removed from the mold after a period of 24 hours, then dried in the open air for a period of 48 hours, again dried by heating, and finally burned at a temperature of about 1500° C. for a period of five days.

The properties of the finished refractory products described above are shown in Table 2.

TABLE 2

| | Bulk specific gravity | Porosity, percent | Compressive strength, kg./cm.$^2$ | Permeability, cm.$^3$cm./cm.$^2$ sec. cm. (H$_2$O) |
|---|---|---|---|---|
| (1) | 3.02 | 20.1 | 1,250 | 3.9 |
| (2) | 2.74 | 24.2 | 960 | 4.2 |
| (3) | 2.60 | 23.8 | 930 | 4.3 |
| (4) | 2.78 | 22.0 | 911 | 4.1 |
| (5) | 1.87 | 20.2 | 380 | 4.2 |

EXAMPLE 2

This example relates to the method of semi-dry molding a refractory shape.

The proportion of ingredients is as follows:

| | Particle size, mm. | Percent by weight |
|---|---|---|
| (6) Electrofused alumina | 1–0.3 | 30 |
| | 0.3–0.147 | 20 |
| | 0.147 | 40 |
| Bond Clay | | 10 |
| (7) Sillimanite | 1–0.3 | 30 |
| | 0.3–0.147 | 20 |
| | 0.147 | 40 |
| Bond clay | | 10 |

Each of the refractory compositions described above had about 8% by weight water added thereto to produce a plastic material, which was stamped into a mold in which a nylon net of 10 mm. mesh of nylon filament 0.5 mm. size had been placed as shown in FIG. 6. The refractory shape was removed from the mold, then dried in the open air for a period of 24 hours, again dried by heating for a period of 24 hours, and finally burned at the temperature of 1500° C. for a period of five days.

The properties of finished refractory products described in Example 2 are shown in Table 3.

TABLE 3

|     | Bulk specific gravity | Porosity, percent | Compressive strength, kg./cm.² | Permeability, cm.³cm./ cm.² sec. cm. (H₂O) |
| --- | --- | --- | --- | --- |
| (6) | 3.01 | 18.5 | 1366 | 5.5 |
| (7) | 2.64 | 15.7 | 1280 | 5.8 |

EXAMPLE 3

This example relates to a porcelain pipe to be embedded in the refractory.

(1) A groove was cut into the end face of the dense structure refractory of FIG. 10 manufactured by the conventional method from No. 6 refractory composition of Example 2. Into this groove was placed a porcelain pipe, outer diameter 5 mm. and inner diameter 1 mm. ($Al_2O_3$ 95%; specific gravity, 3.8; thermal expansion coefficient, $7.8 \times 10^{-6}$; and compressive strength 7000 kg./cm.²), and then a fire resistant mortar of the same material as the refractory was placed around the pipe to set.

(2) A central bore was drilled through a refractory brick 7 manufactured by the conventional method from No. 7 refractory composition of Example 2 as shown in FIG. 13, and a tungsten pipe 8 of outer diameter 5 mm. and inner diameter 1 mm. was inserted into the bore and fixed by applying a fire resistant mortar of the same material as that of refractory brick 7.

Permeability, cm.³cm./cm.²cm.sec. ($H_2O$) of each product of (1) and (2) of Example 3 is as follows: 7.8 and 7.1.

Figure 19:
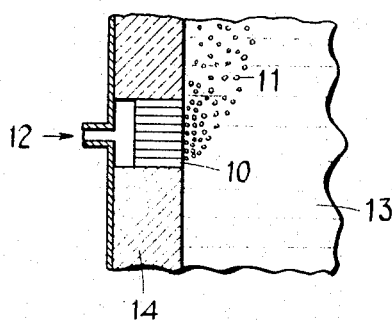
FIGS. 19–20 are diagrammatic views showing two embodiments wherein the oriented permeable refractories of this invention are placed in metallurgical apparatus.
Figure 16:
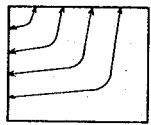
Figure 17:
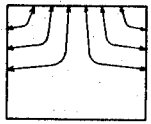
Figure 20:
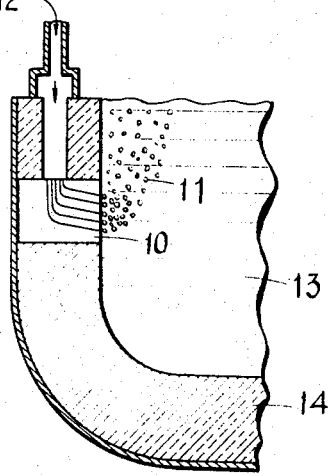
Figure 18:
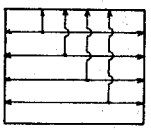

One way of using the oriented permeable refractory brick of this invention in, say, a vacuum degassing molten steel treatment vessel or other metallurgical apparatus is shown in FIGS. 19–20 in which the oriented permeable refractory brick 10, a gas blowing nozzle 12, blowholes 11, a hot liquid melt 13, and a refractory lining 14 of the vessel are shown.

In one practical test, oriented permeable refractory bricks of sillimanite base (No. 3 of Example 1) manufactured in accordance with the invention were provided at two opposite points spaced about 2 m. below the level of molten steel in a 100-t. ladle of an Open Hearth Furnace Works, a quantity of argon gas was blown through the oriented permeable refractories into the hot melt to cause agitation thereof for a period of 10 minutes. It was planned to clean the steel melt by having non-metallic inclusion float on its surface, and it has been found that the oriented permeable refractory of this invention is far more effective than the conventional non-oriented one as shown in the following table.

|     | Conventional refractory | Refractory of this invention |
| --- | --- | --- |
| Pressure of gas required | 5 kg./cm.² | 2 kg./cm.². |
| Amount of argon required | 0.39 m.³/t | 0.22 m.³/t. |
| Erosion loss of permeable refractory, one cycle | 5-8 mm | 1-1.5 mm. |
| Erosion loss of joint | Considerable | Almost none. |
| Decrease of nonmetallic inclusions, oxygen of steel melt: | | |
| Initial, average value | 88 p.p.m | 91 p.p.m. |
| Final, average value | 52 p.p.m | 40 p.p.m. |
| Decrease, average value | 41% | 56%. |

NOTE.—The above permeable refractory of the prior art is the same material as that of this invention, and has properties as follows: bulk specific gravity, 2.57; porosity, 40.5%; compressive strength, 400 kg./cm.² and permeability, 1.0 cm.³cm./cm.² sec. cm. ($H_2O$). This permeability has been obtained by the planned distribution of particles of uniform particle size. p.p.m.=parts per million.

As the oriented permeable refractory of this invention has a small resistance to gas flow, the gas pressure can be small, too. Further, the amount of argon required is small owing to he decrease of useless blowholes or voids. Besides, the loss of joints by erosion never takes place due to the fact that the gas never flows towards the joints. In addition, it is seen that the refractory of this invention has enhanced corrosion resistance, because its porosity is less and its density higher than ever.

While the preferred embodiments of the present invention have been shown and described herein, it is obvious that many structural details may be changed without departing from the spirit and scope of the appended claims.

The invention is claimed as follows:

1. A method of making a refractory body having a number of fine passages extending from one side to the other side thereof in a predetermined orientation through the body and adapted for use in blowing a gaseous substance through the oriented passages to a molten metal to be treated thereby, which method comprises the steps of:

providing a refractory material selected from the group consisting of corundum, mullite, calcined bauxite, sillimanite, magnesia, siliceous rock, and zircon;

grinding said refractory material to a predetermined particle size;

making a semi-dry refractory composition of said refractory material by adding 10% by weight of bondclay thereto;

placing a plurality of incombustible fine diameter elongated members selected from the group consisting of iron wire, steel wire, and copper wire across the mold at a plurality of predetermined positions so as to span the mold from one side to the other side thereof;

placing said semi-dry refractory composition into said mold to form a refractory shape within which said incombustible fine elongated substances are embedded;

withdrawing said incombustible fine elongated substances from said forward refractory shape prior to burning; and subjecting said refractory shape to burning at a temperature of about 1500° C., whereby a plurality of elongated voids which have been left upon withdrawal of said incombustible substances are formed upon burning to provide said number of oriented passages through said refractory shape.

2. The method as claimed in claim 1 in which said refractory material consists of a mixture which comprises 30% by weight particle size of 1–0.3 mm., 20% by weight particle size of 0.3–0.147 mm., and 40% by weight particle size of less than 0.147 mm.

3. The method as claimed in claim 1 in which said fine elongated substance has a diameter of 0.5–2 mm.

References Cited

UNITED STATES PATENTS

| 1,596,494 | 8/1926 | Kern et al. | 264—44 |
| 2,552,553 | 5/1951 | Heine | 264—44 |
| 3,030,687 | 4/1962 | Muspratt | 264—71 |

FOREIGN PATENTS 841,647  7/1960  Great Britain.

DONALD J. ARNOLD, Primary Examiner

U.S. Cl. X.R.

264—59, 67, 154, 332